United States Patent
Hanisch et al.

(10) Patent No.: US 11,050,097 B2
(45) Date of Patent: Jun. 29, 2021

(54) METHOD FOR THE TREATMENT OF USED BATTERIES, IN PARTICULAR RECHARGEABLE BATTERIES, AND BATTERY PROCESSING INSTALLATION

(71) Applicant: DUESENFELD GMBH, Braunschweig (DE)

(72) Inventors: Christian Hanisch, Braunschweig (DE); Bastian Westphal, Braunschweig (DE); Wolfgang Haselrieder, Braunschweig (DE); Martin Schoenitz, Braunschweig (DE)

(73) Assignee: DUESENFELD GMBH, Braunschweig (DE)

( * ) Notice: Subject to any disclaimer, the term of this patent is extended or adjusted under 35 U.S.C. 154(b) by 344 days.

(21) Appl. No.: 15/569,484

(22) PCT Filed: Apr. 28, 2016

(86) PCT No.: PCT/EP2016/059526
§ 371 (c)(1),
(2) Date: Oct. 26, 2017

(87) PCT Pub. No.: WO2016/174156
PCT Pub. Date: Nov. 3, 2016

(65) Prior Publication Data
US 2018/0301769 A1   Oct. 18, 2018

(30) Foreign Application Priority Data

Apr. 28, 2015  (DE) ..................... 10 2015 207 843.4

(51) Int. Cl.
*H01M 10/54*   (2006.01)
*B09B 3/00*   (2006.01)
(Continued)

(52) U.S. Cl.
CPC ............. *H01M 10/54* (2013.01); *B02C 21/00* (2013.01); *B02C 23/10* (2013.01); *B02C 23/20* (2013.01);
(Continued)

(58) Field of Classification Search
CPC ...... Y02W 30/84; Y02P 10/212; B02C 23/08; B02C 23/10; B09B 3/008; B09B 3/0058;
(Continued)

(56) References Cited

U.S. PATENT DOCUMENTS 5,632,863 A * 5/1997 Meador ................... C10B 47/44
                                                           201/25
6,524,737 B1 * 2/2003 Tanii ....................... C22B 7/005
                                                           429/49
(Continued)

FOREIGN PATENT DOCUMENTS

CN   102496752 A   6/2012
CN   103959553 A   7/2014
(Continued)

OTHER PUBLICATIONS

Machine Translation of DE 4424825, Translated Sep. 5, 2019, 3 Pages. (Year: 1996).*
(Continued)

*Primary Examiner* — Gregory D Swiatocha
(74) *Attorney, Agent, or Firm* — W&C IP

(57) ABSTRACT

A method is described for the treatment of used batteries, in particular lithium batteries, containing the steps: comminuting the batteries such that comminuted material is obtained, inactivating the comminuted material such that inactivated comminuted material is obtained, and filling a transport container with the inactivated comminuted material. The inactivation is performed by drying the comminuted material, and the comminuted material is dried until an electro-
(Continued)

lyte content is so low that an electrochemical reaction is not possible.

21 Claims, 3 Drawing Sheets

(51) Int. Cl.
    *B01D 53/00*     (2006.01)
    *C22B 1/00*     (2006.01)
    *H01M 6/52*     (2006.01)
    *B02C 21/00*     (2006.01)
    *B02C 23/10*     (2006.01)
    *B02C 23/20*     (2006.01)
    *B01D 53/04*     (2006.01)

(52) U.S. Cl.
    CPC ............ *B09B 3/0058* (2013.01); *C22B 1/005* (2013.01); *H01M 6/52* (2013.01); *B01D 53/002* (2013.01); *B01D 53/04* (2013.01); *B01D 2253/102* (2013.01); *Y02P 10/20* (2015.11); *Y02W 30/84* (2015.05)

(58) Field of Classification Search
    CPC ...... B01D 53/05; B01D 53/002; B01D 11/00; B01D 2253/102; H01M 10/54; H01M 6/52
    See application file for complete search history.

(56) References Cited

U.S. PATENT DOCUMENTS

| | | | |
|---|---|---|---|
| 8,210,456 B2 * | 7/2012 | Stevens | B03B 9/061 241/19 |
| 9,780,419 B2 * | 10/2017 | Hanisch | H01M 10/54 |
| 2003/0186110 A1 * | 10/2003 | Sloop | H01G 9/038 429/49 |
| 2005/0241943 A1 | 11/2005 | Kakuta et al. | |
| 2007/0134546 A1 * | 6/2007 | Hashimoto | C22B 7/005 429/49 |
| 2014/0003568 A1 * | 1/2014 | Eckardt | B01D 47/10 376/283 |
| 2014/0290438 A1 | 10/2014 | Hanisch | |
| 2016/0043450 A1 * | 2/2016 | Sloop | C01G 53/50 252/182.1 |
| 2016/0049699 A1 | 2/2016 | Hayashi et al. | |

FOREIGN PATENT DOCUMENTS

| | | | | |
|---|---|---|---|---|
| CN | 106259062 B | | 9/2015 | |
| DE | 4424825 A1 * | | 1/1996 | ............ B03B 9/061 |
| DE | 4424825 A1 | | 1/1996 | |
| DE | 10 2011 110 083 A1 | | 2/2013 | |
| DE | 10 2012 024 876 A1 | | 6/2014 | |
| JP | 2005197149 A | | 7/2005 | |
| KR | 20060101683 | | 3/2005 | |
| KR | 10-0665626 B1 | | 1/2007 | |
| WO | 2010/102337 A1 | | 9/2010 | |
| WO | 2010/102377 A1 | | 9/2010 | |
| WO | 2010/149611 A1 | | 12/2010 | |
| WO | WO-2013023640 A1 * | | 2/2013 | ............ H01M 10/54 |

OTHER PUBLICATIONS

Machine Translation of WO 2013/023640, Translated Sep. 5, 2019, 5 Pages (Year: 2013).*
Machine translation of CN 102496752, 4 Pages. (Year: 2012).*
Dehnert et al: "Vacuum Distillation", Allgemeine Chemie, 14.3, p. 14, 1979.
Wolf et al: Allgemeine and Physikalische Chemie, Chemie, 1985.

* cited by examiner

METHOD FOR THE TREATMENT OF USED BATTERIES, IN PARTICULAR RECHARGEABLE BATTERIES, AND BATTERY PROCESSING INSTALLATION

FIELD OF THE INVENTION

The invention refers to a method for the treatment of used batteries, in particular used lithium batteries, such as lithium ion batteries, with the steps (a) comminuting the batteries such that comminuted material is obtained, (b) inactivating of the comminuted material such that an inactive comminuted material is obtained, and (c) filling a transport container with the inactive comminuted material.

According to a second aspect, the invention refers to a battery processing installation for the treatment of used batteries, in particular for the treatment of used lithium batteries with (a) a comminuting device for comminuting the batteries such that comminuted material is obtained, (b) an inactivation device for inactivating the comminuted material and (c) a filling device for filling a transport container with the inactivated comminuted material.

BACKGROUND

US 2005/0241943 A1 describes a method for processing used batteries in which the batteries are heated prior to a comminuting step, thereby destroying plastic components in the batteries. The disadvantage of this type of procedure is that the remaining components of the batteries may be contaminated with degradation products of the plastic.

DE 10 2012 024 876 A1 describes a system for transferring transport-critical electrolyte cells, in which they are initially comminuted under inert gas and then dusted with a deactivation powder so as to prevent the electrochemically active material from spontaneously combusting. The disadvantage of this is that the resulting material still poses a comparatively high hazard potential and that the dusting powder itself poses a risk of explosion and that the formation of a flammable and explosive atmosphere in the transport container cannot be ruled out.

DE 10 2011 110 083 A1 describes a method for recovering active material from a galvanic cell, in which the galvanic cells are initially mechanically comminuted, then pre-dried and subsequently sifted. Finally, the binder is broken down in an oven. This type of device is very well-suited to the efficient recycling of larger amounts of galvanic elements. However, for partial load operation, the construction of this installation is comparatively complex.

SUMMARY

The invention aims to reduce disadvantages of the prior art.

The invention solves the problem by means of a method according to the preamble, in which the inactivation occurs at least also by way of drying the comminuted material. According to a second aspect, the invention solves the problem through a battery processing installation according to the preamble, the activation device of which comprises a drying device.

The advantage of the invention is that the amount of electrolyte that can be obtained from the comminuted material through drying is such that an electrochemical reaction is no longer possible, or only to a negligibly small extent. In addition, no flammable or explosive gas phase forms above the battery fragments, as the organic carbonates of the electrolyte have been removed [from the fragments]. The comminuted material is therefore largely inert and can be transported safely, especially if it is packed under vacuum.

A further advantage is that no additional material has to be added to inactivate the comminuted material. This decreases the complexity of the battery processing, reduces the weight of the inactivated comminuted material and increases the purity in the subsequent separation and recycling steps. In particular, in potential subsequent hydrometallurgical processing steps, a high degree of product purity that does not require the input of foreign ions is advantageous.

In addition, it is advantageous that a comminuted material is obtained that can be transported safely. The organic carbonate content is preferably so small that the formation of a significant amount of fluorophosphates can be ruled out.

Fluorophosphates are often strong neurotoxins, the formation of which must be reliably prevented. Furthermore, due to the low electrolyte content, it is guaranteed that a self-amplifying and intensifying build-up of heat triggered by an electrochemical reaction cannot occur.

Within the scope of the present description, the term drying should be understood particularly to mean the removal of at least one solvent in the conducting salt. In particular, the drying is executed such that dimethyl carbonate and/or ethyl methyl carbonate is removed.

The battery should be understood especially to mean a lithium battery. A lithium battery is a rechargeable battery whose electrochemical reaction involves lithium and/or lithium ions and/or a lithium compound.

A battery processing installation should also be understood particularly to mean a rechargeable battery processing installation for processing rechargeable batteries.

The transport container should also be understood particularly to mean transport packaging. The transport packaging is preferably sealed by way of a vacuum seal. Aluminium composite foil is especially well-suited as transport packaging.

It is beneficial if the drying occurs after the comminuting of the batteries. It is indeed possible and represents a preferred embodiment that the batteries are exposed to a vacuum when in an uncomminuted state such that at least parts of the electrolyte vaporise, wherein the resulting gas either escapes through a safety valve in the rechargeable battery or the battery is destroyed by the pressure difference between the external environment and the internal pressure, enabling a vaporising electrolyte to escape. However, since the electrolyte is predominantly located between tightly wound or stacked and pressed layers of electrodes and separators and in their pores, and it is connected to other components of the batteries, this procedure can be very time-consuming. It is thus often more beneficial and represents a preferred embodiment of the invention for the batteries to be mechanically comminuted, for example through cutting, cropping, impact, separating and/or compressing. This means that a larger interface is available for the transition of materials into the gas phase.

The drying may occur by way of vacuum drying, contact drying, convection drying and/or infra-red drying. It is favourable if the drying occurs while the comminuted material is being agitated and/or circulated.

Prior to being comminuted, the used batteries are preferably dismantled. This means that larger battery systems are dismantled into their smaller subcomponents, the modules or stacks, or even that the cells which contain the electrochemically active material are separated from the control electronics. The control electronics comprise, for example, semiconductor elements and/or sensors and are responsible for the charge control of the batteries.

According to a preferred embodiment, the drying occurs under vacuum. The size of the vacuum is preferably selected such that the vapour pressure of dimethyl carbonate at 80° C., especially at 70° C., is not reached. It is beneficial if the drying occurs at a maximum pressure of 300 hPa, in particular a maximum of 100 hPa. At such low pressures, considerable parts of most electrolytes vaporise, especially dimethyl carbonate and ethyl methyl carbonate, and do so at temperatures of less than 80° C. The advantage of low temperatures is that the formation of hydrogen fluoride is hindered. Hydrogen fluoride poses a potential risk for the battery processing installation and the surroundings. It is therefore beneficial to prevent the development of hydrogen fluoride.

The drying preferably occurs at a temperature that is lower than a decomposition temperature. The decomposition temperature should be understood particularly to mean the lowest temperature at which at least 80 percent by mass of the binder has decomposed into gaseous components after keeping the comminuted material at this temperature for an hour. The decomposition temperature can be measured by successively increasing the temperature of the comminuted material and recording when a loss of mass occurs, especially through the build-up of gas due to a decomposition of the binder, and the specified criteria is fulfilled. If necessary, the experiment must be conducted several times, each time using a new sample of comminuted material at an increased temperature.

It is favourable if the drying occurs under an atmosphere in which the partial pressure of the water vapor is lower than 50 Pa, in particular lower than 10 Pa. A low partial pressure of the water vapor leads to a low reaction rate of lithium compounds to lithium hydroxide and thus only to a low build-up of hydrogen. This prevents the formation of flammable hydrogen-oxygen mixtures and contributes to the safety of the installation.

In addition, it is favourable if the partial pressure of oxygen has a maximum value of 10 millibars, especially a maximum value of 5 millibars. This largely inhibits the reaction of oxygen with oxidisable components of the batteries. It is possible to achieve the low partial pressure of oxygen by means of drying at a low pressure. Alternatively or additionally, the drying may occur in an inert gas atmosphere.

A method is preferred in which the drying of the comminuted material is only completed if, after the completion of the drying process, no flammable or explosive gas mixture can form above the comminuted material that has been filled [in the container] and/or when the comminuted material is so dry that a flammable or explosive gas mixture can emerge in the transport container or during the subsequent processing. The property that the drying is completed if, after the completion of the drying process, no flammable or explosive gas mixture can form above the comminuted material that has been filled [in the container] should be understood particularly to mean that, within the space of one week at 50° C. and 1013 hPa, no flammable gas mixture forms in a transport container in the form of a 50 litre container that has been half-filled (relative to its volume) with the comminuted material. Pre-tests determine whether the criteria has been fulfilled. If a flammable gas mixture does form, the drying must be conducted for a longer time and/or at a lower pressure. The preliminary tests are repeated until a drying time and/or drying pressure has been identified at which, in a set of tests of three transport containers, the requirements for the property have been fulfilled for all three transport containers.

The comminuted material is preferably dried until an electrolyte content in the comminuted material is so low that an electrochemical reaction is impossible. In other words, the electrolyte content is lower than a threshold value, the threshold value being selected such that, if this threshold value is not achieved, the cell voltage is reduced to a maximum of one quarter. This threshold value is determined, for example, by defining the cell voltage of a battery in relation to the electrolyte content. Shortly before achieving the threshold value, the cell voltage collapses, i.e. it decreases by at least 75%. If the threshold value is not achieved, the battery contains so little electrolyte that, to a good approximation, an electrochemical reaction is no longer possible.

The comminuted material is preferably dried for so long that a 50 kg amount of comminuted material, which is contained in a compacted form in a 50 litre drum, does not experience a build-up of heat, or the build-up of heat is so low that a thermal runaway, i.e. a thermally induced chain reaction, is ruled out for at least two months, and that any build-up of hydrogen is also so low that after two weeks, no excess pressure occurs if a negative pressure of 500 hPa is present to begin with.

It is beneficial if the comminuted material is dried until the electrolyte content of organic components that are volatile at 80° C. has a maximum value of 3% by weight, in particular a maximum of 2% by weight, especially preferably a maximum of 1.5% by weight.

The drying is preferably conducted for so long that the accumulated content of organic carbonates from the electrolyte that are volatile at 80° C. falls short of 3% by volume in the atmosphere above the comminuted material.

In particular, the drying is conducted until the dimethyl carbonate content is lower than 4% by volume, especially 3% by volume, and/or the cyclohexylbenzene content is lower than 1% by volume, in particular 0.5% by volume.

The drying preferably occurs immediately after comminution. This should be understood to mean that the time between the beginning of the comminution of the batteries and the point at which at least a part of the resulting comminuted material begins to dry is a maximum of five minutes, especially a maximum of one minute. The rapid drying after comminution means that the mass of material that may potentially experience an electrochemical reaction remains small; the electrochemical reaction time of potential exothermic reactions also remains small. This reduces the risk for the installation and the surroundings.

It is especially favourable if the vacuum is created by means of an injector, i.e. a venturi pump or an ejector-jet pump. Ejector-jet pumps are largely resistant to aggressive gases that are due to be pumped, particularly if an appropriate pump fluid, i.e. pump liquid, is selected. It is beneficial if the pump fluid, which is a liquid, has a pH value of at least 8, in particular of at least 9, for example at least 12. In this case, unwanted components of the gas that is being pumped can decompose or react to become less damaging substances. In this way, for example, dimethyl carbonates and/or ethyl methyl carbonates can be broken down by a saponification reaction. Any hydrogen fluoride contained in the pump fluid can be converted in the alkaline environment into a non-hazardous salt by way of an acid-base reaction.

The pump fluid preferably contains a substance that precipitates fluoride. For example, the pump fluid may contain sodium carbonate or calcium carbonate. The salts that result from the reaction with a fluorine compound, in particular hydrogen fluoride, are preferably separated, in particular filtered or removed by sedimentation. This at least largely prevents hydrogen fluoride or other poisonous fluorine compounds from being emitted into the surroundings.

The drying preferably occurs at a maximum temperature of 80° C.: this produces almost no hydrogen fluoride. This increases the service life of the battery processing installation and reduces the environmental risk.

According to a preferred embodiment, the method comprises the steps of condensing components of the electrolyte by cooling and/or increasing the pressure such that an electrolyte condensate occurs. For example, the condensation is conducted at a point that lies between the dryer and the vacuum pump relative to the flow of gas. In this case, gases coming from the dryer must initially pass through a condenser before reaching the vacuum pump. This causes the gaseous electrolyte in the gas, which is produced during the drying, to be at least largely separated in the condenser before the remaining gas reaches the pump. Electrolyte can be recovered in this way. In addition, the flow of gas through the vacuum pump decreases, which increases the vacuum pump's service life and reduces its energy consumption.

According to a preferred embodiment, the method alternatively comprises the step of purifying the gas through the adsorption of the volatile organic components of an activated carbon filter in front of or behind the compressor unit.

Alternatively or additionally, the method according to the invention preferably comprises the step of purifying the gas produced during the drying before it reaches the vacuum pump. This may also occur, for example, by the gas through passing an activated carbon filter and/or a filter that contains substances which react with hydrogen fluoride, such as a calcium salt like calcium carbonate or a potassium salt such as potassium carbonate.

The method according to the invention preferably comprises the step of drying at a drying temperature and for a drying time that have been selected such that the binder which binds the active material of the lithium battery to a carrier at least largely decomposes. It is favourable if this drying step, which can also be described as high temperature drying, occurs in a separate space from a first drying step, described above. The latter drying step can also be described as low temperature drying.

The high temperature drying, during which the binder decomposes, is preferably conducted such that the resulting decomposition gases do not mix with the gases resulting from the low temperature drying. It is possible that the high temperature drying and the low temperature drying occur at different pressures. For example, the high temperature drying can be executed at normal pressure.

The active material should be understood to mean the material that reacts electrochemically during operation of the batteries. The carrier for the active material should be understood particularly to mean a carrier foil to which the active material is applied in the form of particles. For example, the carrier foil refers to a foil made of aluminium or an aluminium alloy. The binder is the material which binds the active material with the carrier; for example, the binder contains polyvinylidene fluoride.

It is beneficial if liquid nitrogen is added when comminuting the batteries. This cools the batteries, the comminuting machine and the comminuting material, and also drives oxygen and water vapour out of the atmosphere.

It is beneficial if the comminution occurs when the partial pressure of water vapor is a maximum of 20 Pa and/or the partial pressure of the oxygen is a maximum of 40 hPa, especially a maximum of 15 hPa.

According to a preferred embodiment, the method comprises the steps of removing the comminuted material from the transport container; detaching hard parts and/or separating active material from the carrier, particularly via a second comminuting stage and/or air jet sieving, thereby producing an active material fraction and a carrier fraction; and a separate packing of the active material fraction and carrier fraction in suitable transport containers. It is beneficial if these transport containers are designed to be airtight. By separating an active material fraction and a carrier fraction, transportation generally does not require any permits. An additional advantage is that fractions separated in this way only pose a small risk.

The removal of the comminuted material from the transport container is preferably conducted under vacuum and/or shielding gas.

It is possible, but not necessary, for the transport container to be filled with comminuted material under vacuum. It is beneficial if the transport container is a vacuum container, in particular an evacuated vacuum container, such that a negative pressure or vacuum occurs in the transport container once it has been sealed. Alternatively, the transport container may be filled with an inert gas.

In a preferred battery processing installation, the separation unit and the drying device are arranged in a joint standard container. The advantage of this is that it renders the battery processing installation especially easy to transport.

The drying device is configured to dry the comminuted material until an electrolyte content is so low that an electrochemical reaction is impossible. If the drying device is operated in batch mode, which represents a preferred embodiment, the drying shall be performed, for example, for a pre-determined period of time. Alternatively or additionally, the content of organic substances, such as organic carbonates, in the atmosphere in the drying device is continually measured and the drying stopped once the concentration is lower than a pre-determined threshold concentration.

According to a preferred embodiment, the battery processing installation, in particular the vacuum installation, comprises a condenser that is configured to condense organic components of the atmosphere in the dryer, especially organic carbonates such as dimethyl carbonate, ethyl methyl carbonate and/or ethylene carbonate. The condenser is preferably arranged in the direction of material flow in front of a vacuum pump, by means of which the dryer is evacuated. It is beneficial if the condenser is cooled, preferably to a maximum temperature of 90° C., preferably a maximum of 80° C., especially preferably a maximum of 70° C. In order to keep the energy required for cooling low, the condenser, insofar as it is cooled, is cooled to a temperature of at least −10° C., in particular at least 10° C.

It is beneficial if the drying device comprises an agitator, for example an anchor agitator or a rod agitator, whose stirring rods can be arranged transversely to an agitator shaft. Alternatively or additionally, the agitator is an external agitator that moves the dryer as a whole.

The battery processing installation preferably has a vacuum installation that is connected to the drying device for the purpose of generating a vacuum in the drying device. It is especially favourable if the vacuum installation is also arranged in the standard container. The standard container preferably refers to a container that conforms to ISO standard 668, preferably a 40 foot container or a 20 foot container.

For example, the vacuum installation comprises an injector or venturi pump, i.e. a jet pump with a pump liquid that is used to generate the negative pressure.

The battery processing installation preferably has a hard metal detachment device and/or a light fraction separation device; a separation device, especially a classification device, for separating active material from the carrier, in particular by means of a second comminution stage and/or air jet sieving, such that an active material fraction and a carrier fraction occur; and a second filling device for the separate filling of the active material fraction and the carrier fraction. It is beneficial if this filling device is designed for filling under negative pressure and/or inter gas.

A hard metal detachment device should be understood particularly to mean a device for detaching fragments of peripheral components of the operating system, the battery cell casing and the electrical contacts. For example, the hard metal detachment device has a magnet separation device and/or a separator, in particular a cross-flow separator and/or a zigzag separator. The separation device should be understood particularly to mean a device for detaching the separator foil.

The light fraction separation device preferably has a zigzag separator and/or an air separator, wherein it is favourable if the air is conducted within a circuit. This reduces the exposure of the environment to harmful dust.

The second filling device and the separation devices are preferably arranged in a joint standard container, for example in the first standard container described above or a second standard container. It is beneficial if the container is sealed so as to be dust-tight.

The battery processing installation preferably has an airlock between the comminution unit and the inactivation device, especially the drying device. For example, this refers to a rotary airlock. The airlock reduces the amount of oxygen introduced into the inactivation device, especially the drying device.

BRIEF DESCRIPTION OF THE DRAWINGS

In the following, the invention will be explained in more detail by way of the attached drawings. They show FIG. 1 a flow diagram of a method according to the invention, FIG. 2 a cross-section through a battery processing installation according to the invention and FIG. 3 a cross-section through further optional components of a battery processing installation according to the invention.

DETAILED DESCRIPTION

Figure 1:
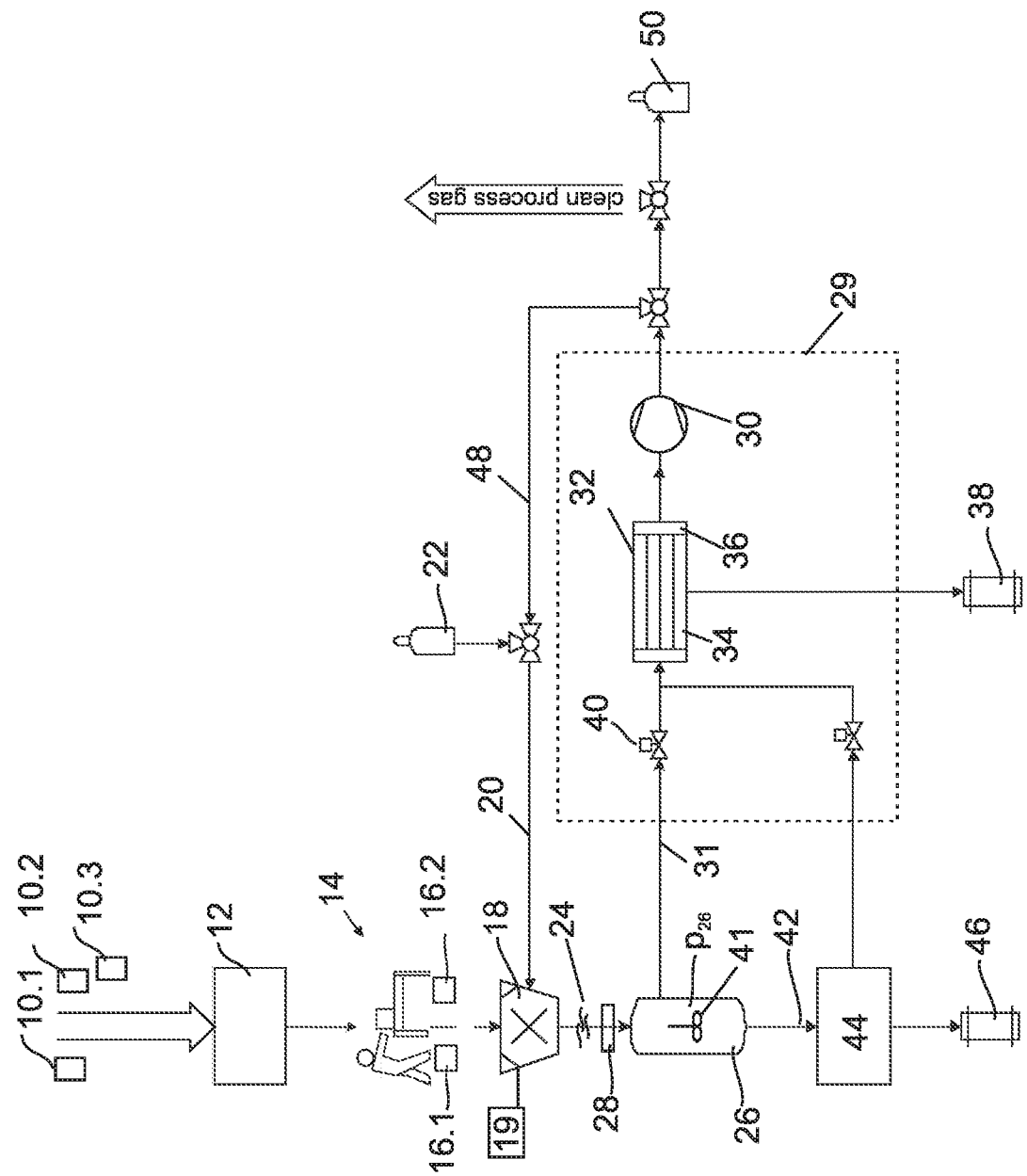

FIG. 1 shows a flow diagram of a method according to the invention. Batteries 10.1, 10.2, . . . , in particular battery systems made up of several battery modules or battery stacks, which are in turn made up of several battery cells, are initially discharged in a discharge unit 12. This is followed by the dismantling of the batteries 10 at a dismantling station 14, if this is necessary because the battery systems cannot otherwise be delivered into the comminution unit for geometric or gravimetric reasons. In order to do this, the battery systems are opened and dismantled to the point at which the modules/stacks can be individually removed. If required, the cells can also be separated from the drive electronics. The resulting sub-units (modules/stacks) and/or cells 16.1, 16.2, . . . are fed into a comminution unit 18, which comprises, for example, a rotary shear with a rotor and a stator or several rotors, or a cutting mill with a rotor and several rotors.

The comminution unit 18 comminutes the batteries 10 under shielding gas 20, which is extracted, for example, from a shielding gas cylinder 22. Alternatively or additionally, liquid nitrogen from a liquid nitrogen source 19 may be injected. The shielding gas may refer, for example, to nitrogen, a noble gas, carbon dioxide, nitrous oxide or another gas which is preferably not toxic.

Comminuted material 24 is produced during the comminuting; the material is fed into an inactivation device in the form of a drying device 26. An airlock 28 is arranged between the comminution unit 18 and the drying device 26, the airlock being so gas-tight that the drying device 26 is—to a good approximation—separated from the comminution unit 18 so as to be gas-tight.

The drying device 26 is connected to a vacuum installation 29 that comprises a vacuum pump 30 and creates a vacuum. A pressure $p_{26}$ from $p_{26}=100$ hPa, preferably 50 hPa, is present in the drying device 26. It should be noted that, within the scope of the present description, the vacuum pump should be understood particularly generally to mean a device that creates a vacuum. It is possible and preferred, but not necessary, for the vacuum pump to simultaneously work as a compressor, such that gas is emitted from it under a pressure that is greater than the ambient pressure.

In the case depicted in FIG. 1, the vacuum pump is a compressor which sucks in and compresses gas 31 that is present in the drying device 26. Alternatively or additionally, the vacuum installation 29 may have a jet pump which uses a pump liquid in the form of a liquid that is conducted at a high speed through Venturi nozzles. The pump liquid is alkaline and has a pH value of at least pH 1 and is, for example, a 10% potassium hydroxide solution.

The vacuum installation 29 comprises a gas purification device 32 that is arranged between the drying device 26 and the vacuum pump 30, and which has a condenser 34 and/or an activated carbon filter 36 in the present case. The condenser is operated at a temperature of −10° C. so that dimethyl carbonate and ethyl methyl carbonate condense and can be dispensed into a condensate container 38. In addition, any water present is separated by freezing. A control valve 40 is designed to open if the pressure $p_{26}$ becomes too great and to close if the pressure $p_{26}$ becomes too small, i.e. when a pre-determined threshold value is not reached.

The drying material is preferably moved during drying. This may be achieved via agitating with an agitator 41, such as an anchor agitator or a rod agitator with rods arranged perpendicular to the agitator shaft. Alternatively, it can be achieved by way of a drying container that is moved.

The drying of the comminuted material results in inactivated comminuted material 42, which is fed into a filling device 44. A transport container 46 is then filled with the inactivated comminuted material 42 under vacuum and/or shielding gas. The transport container 46 is preferably gas-tight. It is possible, but not necessary, for the transport container 46 to be filled with inert gas prior to transportation such that it is under normal pressure. Alternatively, it is also possible for the transport container to be sealed under vacuum and transported. It is possible that, instead of the transport container, a vacuum-sealed foil is selected, such as an aluminium compound foil.

The comminution unit 18 is fed with shielding gas 20 from the vacuum pump 30 via a flushing line 48. If the vacuum pump 30 also functions as a compressor—as in the present case—which represents a preferred embodiment, the shielding gas can be stored in a pressurised gas cylinder 50. Alternatively or additionally, the shielding gas 20 can be given off into the surroundings, following additional cleaning if necessary.

Figure 2:
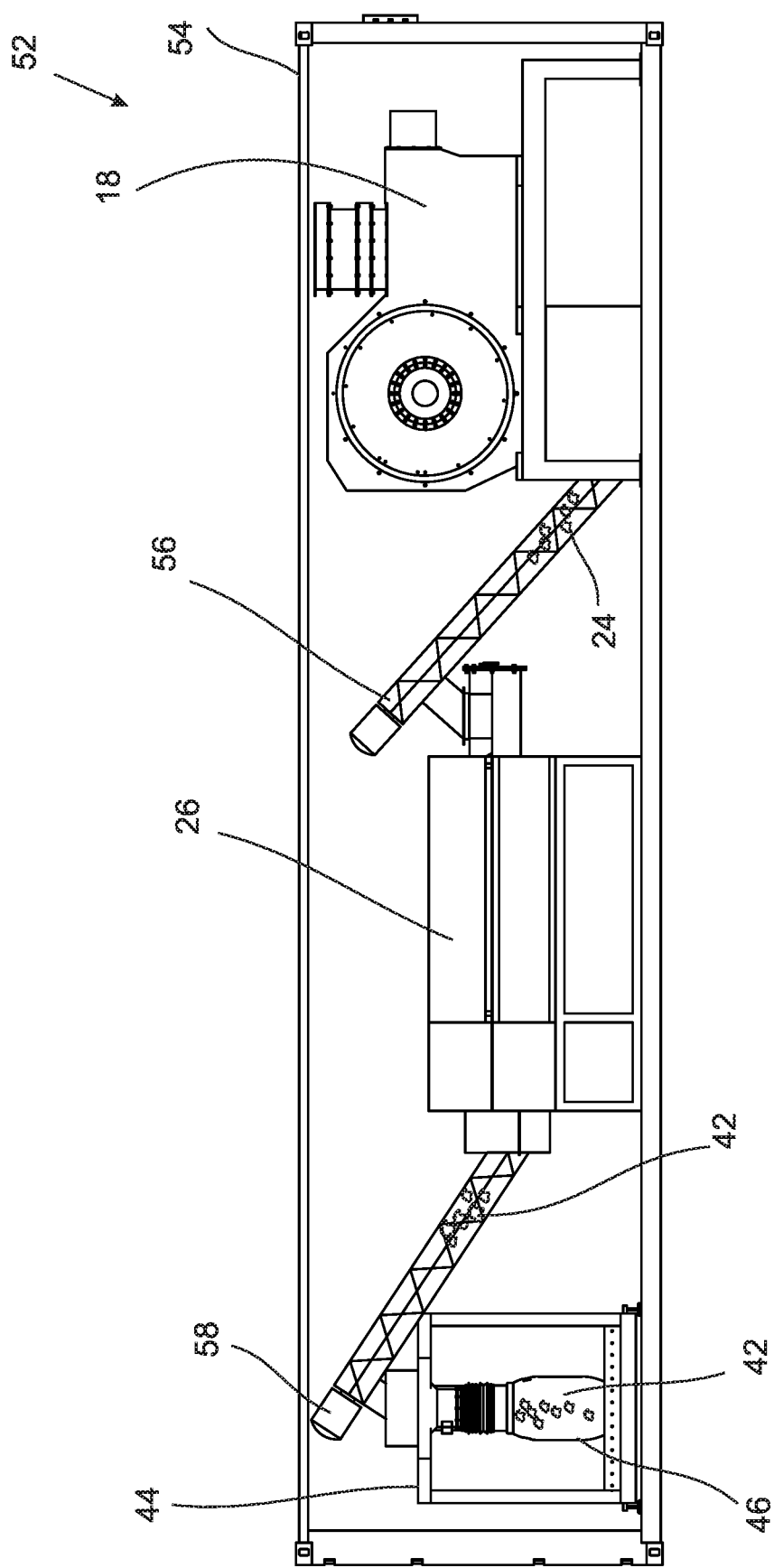

FIG. 2 schematically depicts a cross-section through a battery processing installation 52 according to the invention, which comprises a standard container 54 in which the comminution unit 18, the drying device 26 and the filling device 44 are arranged. A first gas-tight conveyor 56 is arranged behind the comminution unit 18; the conveyor comprises, for example, a screw conveyor or a tube chain conveyor. The first conveyor 56 delivers the comminuted material 24 to the drying device 26, which is connected to the vacuum generation device, not depicted in FIG. 2. A second conveyor 58 is arranged behind the drying device 26 in the direction of material flow; preferably, the conveyor is also designed to be gas-tight and may include a screw conveyor or a tube chain conveyor. The second conveyor delivers the inactivated comminuted material 42 to the filling device 44.

Figure 3:
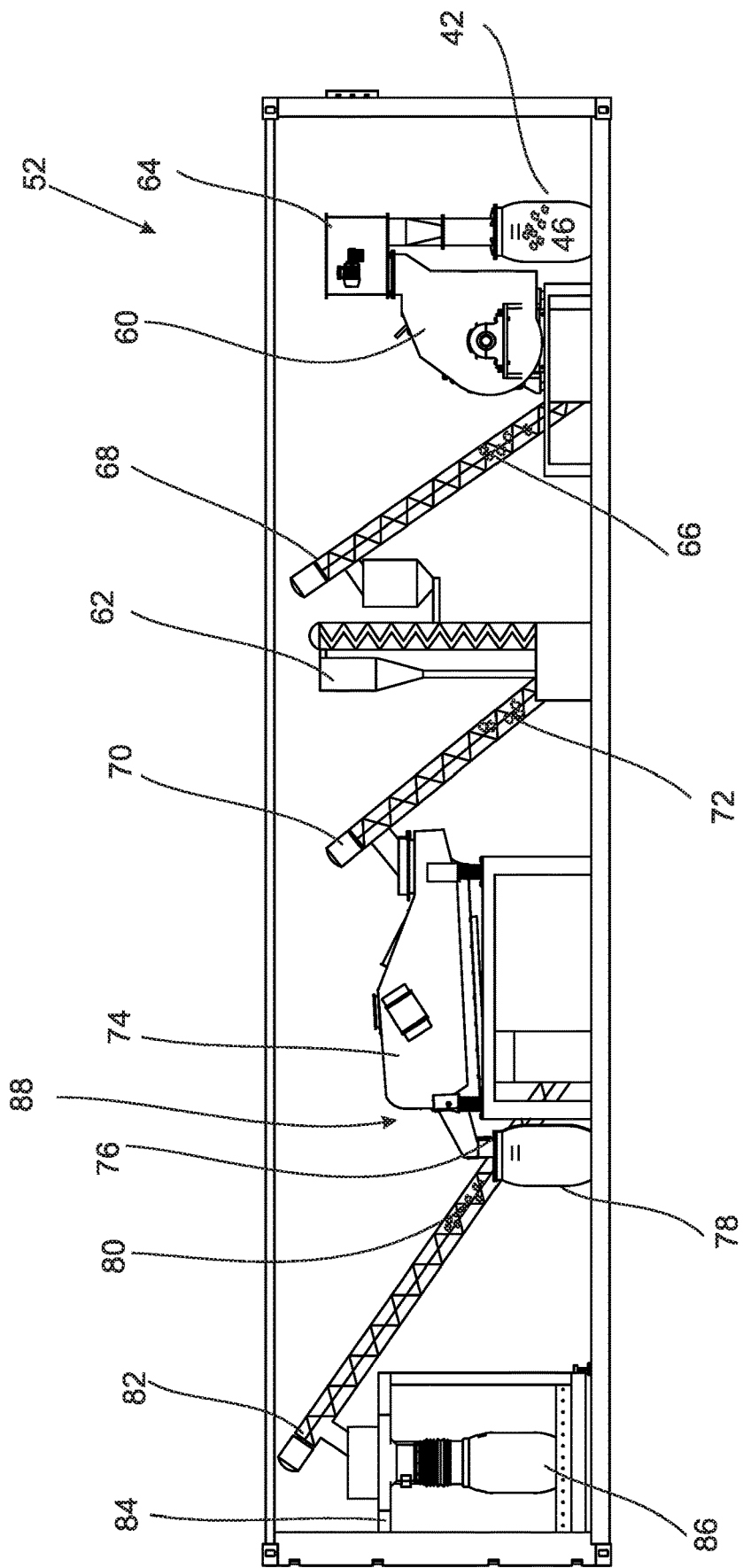

FIG. 3 depicts optional units—available in the present embodiment—of the battery processing installation 52 according to the invention which comprise a breakdown comminutor 60, as well as a separator 62. The breakdown comminutor 60 contains a transport container draining device 64, by means of which inactivated comminuted material 42 can be removed from the transport container 46. The breakdown comminutor 60 produces breakdown material 66, which is fed into the separator 62. The separator may refer, for example, to a zigzag separator.

The battery processing installation 52 preferably comprises a comminutor, which is preferably situated in the material flow in front of the classification device 74 and includes a rapid comminution tool, wherein a peripheral speed of the rotor is greater than 1 m/s, preferably greater than 10 m/s. This comminutor comminutes the comminuted material and subjects it to such mechanical stress that the electrochemically active coating at least partially detaches from the carrier. The presence of such a comminutor is a generally preferred feature of a battery processing installation according to the invention.

A light fraction with a separator foil and fine coating material, and a heavy material fraction with carrier foils (aluminium and copper) with bigger, weakly adhering coating occur in the separator. Both fractions are each placed on a sieve for further separation into coating and separator foil, or coating and metal foil. The further processing of the resulting fractions is conducted separately.

The breakdown material 66 is fed to the separator 62 by means of a third conveyor 68. A fourth conveyor 70 guides sifted material 72, in particular the material of the light fraction that leaves the separator 62, into a classification device 74. The classification device 74 preferably has an air jet sieve, which simultaneously functions as a separation device for separating the active material from the carrier. The separation results in an active material fraction 76, with which a transport container 78 is filled.

In addition, a carrier fraction 80 is produced, which—in the present embodiment—is fed into a filling unit 84 using a fifth conveyor 82; the filling unit fills a container 86 with the carrier fraction 80. The filling unit 84 comes together with a second filling unit 88 to form part of a second filling device.

REFERENCE LIST

| | |
|---|---|
| 10 | battery |
| 12 | discharge unit |
| 14 | dismantling station |
| 16 | cell |
| 18 | comminution unit |
| 19 | liquid nitrogen source |
| 20 | shielding gas |
| 22 | shielding gas cylinder |
| 24 | comminuted material |
| 26 | drying device |
| 28 | airlock |
| 29 | vacuum installation |
| 30 | vacuum pump |
| 31 | gas |
| 32 | gas purification device |
| 34 | condenser |
| 36 | activated charcoal filter |
| 38 | condensate container |
| 40 | control valve |
| 41 | agitator |
| 42 | inactive comminuted material |
| 44 | filling device |
| 46 | transport container |
| 48 | flushing line |
| 50 | pressurised gas cylinder |
| 52 | battery processing installation |
| 54 | standard container |
| 56 | first conveyor |
| 58 | second conveyor |
| 60 | breakdown comminutor |
| 62 | separator |
| 64 | transport container draining device |
| 66 | breakdown material |
| 68 | third conveyor |
| 70 | fourth conveyor |
| 72 | sifted material |
| 74 | classification device |
| 76 | active material fraction |
| 78 | transport container |
| 80 | carrier fraction |
| 82 | fifth conveyor |
| 84 | filling unit |
| 86 | container |
| 88 | second filling unit |
| p | pressure |

The invention claimed is:

1. A method for the treatment of used batteries, comprising the steps:
    (a) comminuting the batteries such that comminuted material is obtained;
    (b) inactivating the comminuted material such that an inactivated comminuted material is obtained, wherein the inactivating step is performed during or after the comminuting step; and
    (c) filling a transport container with the inactivated comminuted material;
    wherein the inactivating step is performed by drying the comminuted material, and
    wherein the drying occurs at a maximum pressure of 300 hPa.

2. The method according to claim 1, wherein the comminuted material is dried until an electrolyte content in the comminuted material is so low that an electrochemical reaction is impossible.

3. The method according to claim 1, wherein the drying occurs under vacuum.

4. The method according to claim 1, further comprising the steps of:

removing the comminuted material from the transport container; and
one or more of
detaching hard parts,
separating active material from a carrier, such that an active material fraction and a carrier fraction are obtained, and
separately packing the active material fraction and carrier fraction in respective further containers.

5. The method according to claim 4 wherein separation of the active material from the carrier is performed by air jet sieving.

6. The method according to claim 4 wherein separation of the active material from the carrier is performed using a second comminution stage.

7. The method according to claim 1, wherein the drying of the comminuted material is only completed if one or more of the following conditions is met:
no flammable or explosive gas mixture is formable above the comminuted material in the transport container, and
the comminuted material is so dry that no flammable or explosive gas mixture is able to emerge in the transport container.

8. The method according to claim 1 wherein the batteries are lithium batteries.

9. The method according to claim 1 wherein drying occurs at a temperature of less than 80° C.

10. The method according to claim 1 further comprising a step of sealing the transport container so as to be dust-tight after the step of filling with the inactivated comminuted material.

11. A method for the treatment of used batteries, comprising the steps:
(a) comminuting the batteries such that comminuted material is obtained;
(b) inactivating the comminuted material such that an inactivated comminuted material is obtained; and
(c) filling a transport container with the inactivated comminuted material;
wherein the inactivating step is performed by drying the comminuted material,
wherein the drying occurs under vacuum,
wherein the vacuum is created by means of a jet pump, and
wherein a pump liquid of the jet pump has at least one of a pH value of at least 8, and
a substance that precipitates fluoride.

12. A battery processing installation for treatment of used batteries, comprising:
(a) a comminution unit configured to comminute the batteries such that comminuted material is obtained;
(b) an inactivation device comprising a drying device configured to inactivate the comminuted material, wherein the inactivation device is configured to perform the inactivating step during or after the comminuting step of the comminution unit;
(c) a filling device configured to fill a transport container with the inactivated comminuted material; and
(d) a vacuum installation connected to the drying device and configured to generate a vacuum in the drying device.

13. The battery processing installation according to claim 12, wherein the drying device is configured to dry the comminuted material until an electrolyte content in the comminuted material is so low that an electrochemical reaction is impossible.

14. The battery processing installation according to claim 12, wherein the comminution unit and the drying device are arranged in a container.

15. The battery processing installation according to claim 12 further comprising:
a hard metal detachment device and/or a light fraction detachment device;
a separation device configured to separate active material from a carrier such that an active material fraction and a carrier fraction occur; and
a second filling device configured to separately fill the active material fraction and the carrier fraction in respective containers.

16. The battery processing installation of claim 15 wherein the carrier fraction are aluminum and copper foils.

17. The battery processing installation of claim 15, wherein the separation device is an air jet sieving device.

18. The battery processing installation of claim 15 wherein the separation device is a second comminution device.

19. The battery processing installation of claim 12 wherein the batteries are lithium batteries.

20. A battery processing installation for treatment of used batteries, comprising:
(a) a comminution unit configured to comminute the batteries such that comminuted material is obtained;
(b) an inactivation device configured to inactivate the comminuted material, wherein the inactivation device comprises a drying device;
(c) a filling device configured to fill a transport container with the inactivated comminuted material;
(d) a vacuum installation that is connected to the drying device and configured to generate a vacuum in the drying device;
wherein
the vacuum installation has a jet pump with a pump liquid,
the pump liquid is conducted within a circuit, and
the pump liquid contains a substance that reacts with hydrogen fluoride.

21. A method for the treatment of used batteries, comprising the steps:
(a) comminuting the batteries such that comminuted material is obtained,
(b) inactivating the comminuted material such that an inactivated comminuted material is obtained, and
(c) filling a transport container with the inactivated comminuted material,
wherein the inactivating step is performed by drying the comminuted material,
wherein the drying occurs under vacuum,
wherein the vacuum is created by means of a jet pump, and
wherein a pump liquid of the jet pump has a pH value of at least 9.

* * * * *